(12) United States Patent
In et al.

(10) Patent No.: US 11,610,503 B2
(45) Date of Patent: Mar. 21, 2023

(54) ACTUATOR AND TRIPOD STRUCTURE COMPRISING ACTUATOR

(71) Applicant: Saginomiya Seisakusho, Inc., Tokyo (JP)

(72) Inventors: Eisei In, Sayama (JP); Tomonori Uchida, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 0 days.

(21) Appl. No.: 17/627,580

(22) PCT Filed: Jul. 15, 2020

(86) PCT No.: PCT/JP2020/027551
§ 371 (c)(1),
(2) Date: Jan. 14, 2022

(87) PCT Pub. No.: WO2021/039176
PCT Pub. Date: Mar. 4, 2021

(65) Prior Publication Data
US 2022/0268344 A1    Aug. 25, 2022

(30) Foreign Application Priority Data

Aug. 23, 2019   (JP) .............................. JP2019-152951

(51) Int. Cl.
*F16H 25/20*   (2006.01)
*G09B 9/04*   (2006.01)
(Continued)

(52) U.S. Cl.
CPC ............ *G09B 9/04* (2013.01); *F16C 29/0633* (2013.01); *G01M 7/06* (2013.01); *B06B 1/10* (2013.01); *F16H 2025/204* (2013.01)

(58) Field of Classification Search
CPC ...... F16H 2025/204; B06B 1/10; G01M 7/06; F16C 29/0633; G09B 9/04
See application file for complete search history.

(56) References Cited

U.S. PATENT DOCUMENTS 2,197,155 A * 4/1940 Nardone ............. F16H 25/2204
                                                              92/33
5,170,103 A * 12/1992 Rouch ................... F16F 15/005
                                                              318/128

(Continued)

FOREIGN PATENT DOCUMENTS

JP    H11-303966    11/1999
JP    2002-227839 A   8/2002

(Continued)

*Primary Examiner* — David M Fenstermacher
(74) *Attorney, Agent, or Firm* — Workman Nydegger

(57) ABSTRACT

An actuator includes a cylinder sandwiched between a fixing plate fixed to the other end surface of a supporting plate together with a servomotor and a bearing housing, a ball screw shaft having one end protruding into the cylinder through through holes of the fixing plate, a slide block screwed with one end of the ball screw shaft in the cylinder, a cylindrical-shaped piston coupled to an end of the slide block and reciprocatably located in the cylinder, linear motion bearing units located inside the bearing housing to movably support the piston, and linear motion bearing units located in the cylinder to movably support the slide block.

4 Claims, 13 Drawing Sheets

(51) Int. Cl.
    *F16C 29/06*     (2006.01)
    *G01M 7/06*     (2006.01)
    *B06B 1/10*     (2006.01)

(56)               References Cited

U.S. PATENT DOCUMENTS

| | | | |
|---|---|---|---|
| 7,780,573 B1* | 8/2010 | Carmein | A63B 71/0622 |
| | | | 482/4 |
| 7,919,945 B2* | 4/2011 | Houston | A63F 13/24 |
| | | | 318/128 |
| 10,186,165 B2* | 1/2019 | Hosaka | G09B 9/14 |
| 2001/0022868 A1 | 9/2001 | Teramach | |
| 2008/0106223 A1* | 5/2008 | Delson | H01F 7/1615 |
| | | | 318/114 |
| 2009/0100949 A1 | 4/2009 | Shirai et al. | |
| 2010/0092267 A1* | 4/2010 | Najdovski | B25J 13/02 |
| | | | 414/7 |
| 2010/0279255 A1* | 11/2010 | Williams, II | G09B 9/14 |
| | | | 434/29 |
| 2015/0115848 A1* | 4/2015 | McFadden | G06F 3/0362 |
| | | | 318/135 |
| 2021/0268369 A1* | 9/2021 | Warne | A63F 13/28 |

FOREIGN PATENT DOCUMENTS

| | | |
|---|---|---|
| JP | 4842954 B2 | 10/2011 |
| JP | 2015-33671 A | 2/2015 |
| JP | 2015-40614 A | 3/2015 |

\* cited by examiner

ACTUATOR AND TRIPOD STRUCTURE COMPRISING ACTUATOR

TECHNICAL FIELD

The present invention relates to an actuator including a reciprocatable piston and a tripod structure comprising the actuator.

BACKGROUND ART

A driving simulator, as disclosed in Patent Literature 1, for example, includes a vibration system for a simulator. The vibration system for a simulator includes the following as major components: three vibration devices configured to reciprocate and rotate a moving base described later; the moving base located closer to a cockpit of a vehicle model than to each vibration device and connected to one end of each vibration device; a hexapod located between a cockpit supporting bed on which the cockpit is arranged and the moving base to control the orientation of the cockpit supporting bed; a slide duct device attached to each vibration device; and a host computer.

The moving base with three degrees of freedom is reciprocatably and rotatably located on a sliding floor having a predetermined flatness. Three places on a lower surface of the moving base facing a surface of the sliding floor are provided with air bearings, respectively. That is, the moving base is rotatable and reciprocatable along an axis of a piston of an actuator of each vibration device described later.

The three vibration devices are respectively arranged in three places spaced equally along a circumferential direction so as to surround the cockpit. Each of the three vibration devices includes an actuator supporting bed. Each actuator supporting bed is arranged on a floor so that universal joints are located on a common circumference at intervals of a predetermined angle, for example, 120°. Each actuator supporting bed supports an actuator and the like described later via a supporting plate and a universal joint. A tip of the piston of each actuator is connected to an alignment mechanism supporting block provided on the moving base via the universal joint.

As shown in Patent Document 2 for example, the actuator includes the following as major components: a piston (referred to as a rod in Patent Literature 2) reciprocatably located in a cylinder; and a ball screw configured to move the piston in the cylinder via a conversion nut (nut guide) and a support mechanism. One end of the piston is fixed to the conversion nut and the nut guide fixed around the conversion nut, and the other end of the piston protruding outward from an open end of the cylinder is connected to the alignment mechanism supporting block described above via the universal joint. The open end of the cylinder is provided with a sliding bearing configured to slidably support an outer peripheral surface of the piston.

In the above constitution, in a case where the three vibration devices are activated and the moving base is reciprocatably and rotatably moved onto the sliding floor via the air bearing, a bending moment is applied to the piston reciprocated in each actuator, so that the weight of the piston and a reaction force are applied to the sliding bearing and the nut guide in a direction orthogonal to a central axis of the piston. Since the reaction force increases as the stroke amount of the piston becomes relatively large, frictional forces generated between the outer peripheral surface of the piston and an inner peripheral surface of the sliding bearing and between an inner peripheral surface of the cylinder and an outer peripheral surface of the nut guide also increase as the protrusion amount of the piston protruding outward from the open end of the cylinder becomes relatively large.

CITATION LIST

Patent Literature

PTL 1: Japanese Patent Laid-Open No. 2015-33671
PTL 2: Japanese Patent Laid-Open No. 2015-40614
PTL 3: Japanese Patent No. 4842954

SUMMARY OF INVENTION

In the reciprocation of the piston of the actuator described above, in a case where an extended state is shifted to a retracted state, for example, in a case where after the protrusion amount of the piston protruding outward from the open end of the cylinder becomes relatively large, the state of the piston shifts to the retracted state so as to reduce the protrusion amount of the piston, an acceleration shock may be generated in the other end (universal joint) of the piston due to the frictional force described above. In evaluating a vehicle body model, in a case where such an acceleration shock is detected, since it cannot be specified whether the acceleration shock is an acceleration shock resulting from the vehicle body model or an acceleration shock resulting from the three vibration devices, there is a problem in the highly accurate evaluation of the vehicle body model.

In consideration of the above problem, an object of the present invention is to provide an actuator having a reciprocatable piston and a tripod structure comprising the actuator, the reciprocatable piston being capable of reducing an acceleration shock resulting from a turn in the reciprocation of the piston.

In order to achieve the above object, an actuator according to the present invention includes a cylinder supported by a supporting plate together with a drive motor, a piston reciprocatably located in the cylinder, a ball screw shaft located in the cylinder and driven by the drive motor, a slide block screwed with one end of the ball screw shaft in the cylinder and coupled to an end of the piston, a first linear motion bearing unit and a second linear motion bearing unit each of which is located in a bearing housing at one end of the cylinder and has a rail provided in the piston to extend along a central axis of the piston and a guide block configured to support the rail via a rolling element and which support the piston movably, and a third linear motion bearing unit and a fourth linear motion beating unit each of which is located in the cylinder and has a rail pedestal provided on an inner peripheral surface of the cylinder to extend along the central axis of the piston and a guide block configured to support the rail pedestal via the rolling element and which support the slide block movably together with the piston. The first linear motion bearing unit and the second linear motion bearing unit are located individually in a position in a circumferential direction of an outer peripheral portion of the piston in which the weight of the piston is applied and a position in a direction orthogonal to the direction in which the weight of the piston is applied, respectively, and the third linear motion bearing unit and the fourth linear motion bearing unit are located individually in a position in a circumferential direction of an outer peripheral portion of the slide block in which the weight of the piston is applied and a position in a direction orthogonal to the direction in which the weight of the piston is applied, respectively.

The position of the central axis of the piston in the bearing housing is set so as to be eccentric by a predetermined distance in one direction along a radial direction with respect to the position of the central axis of the cylinder, so that each of the first linear motion bearing unit and the second linear motion bearing unit is located in a position in the other direction facing the one direction along the radial direction in the bearing housing. The rolling element may be a ball. An eccentric arrangement saves space and makes the actuator lighter, but the present invention is not limited to the eccentric arrangement.

A tripod structure comprising the actuator according to the present invention includes the first actuator described above, a second actuator and a third actuator having constituent elements identical to those of the first actuator, a first actuator supporting bed configured to rotatably support the first actuator via a universal joint, a second actuator supporting bed configured to rotatably support the second actuator via a universal joint, a third actuator supporting bed configured to rotatably support the third actuator via a universal joint, and a moving base rotatably connected to the tip portion of the piston of the first actuator, the tip portion of the piston of the second actuator, and the tip portion of the piston of the third actuator via a universal joint.

The actuator and the tripod structure comprising the actuator according to the present invention each include the slide block screwed with the one end of the ball screw shaft in the cylinder and coupled to the end of the piston, the first linear motion bearing unit and the second linear motion bearing unit each of which is located in the bearing housing at the one end of the cylinder and has the rail provided in the piston to extend along the central axis of the piston and the guide block configured to support the rail via the rolling element and which support the piston movably, and the third linear motion bearing unit and the fourth linear motion beating unit each of which is located in the cylinder and has the rail pedestal provided on the inner peripheral surface of the cylinder to extend along the central axis of the piston and the guide block configured to support the rail pedestal via the rolling element and which support the slide block movably together with the piston, so that an acceleration shock resulting from the reciprocation of the piston can be reduced.

DESCRIPTION OF EMBODIMENTS

Figure 2:
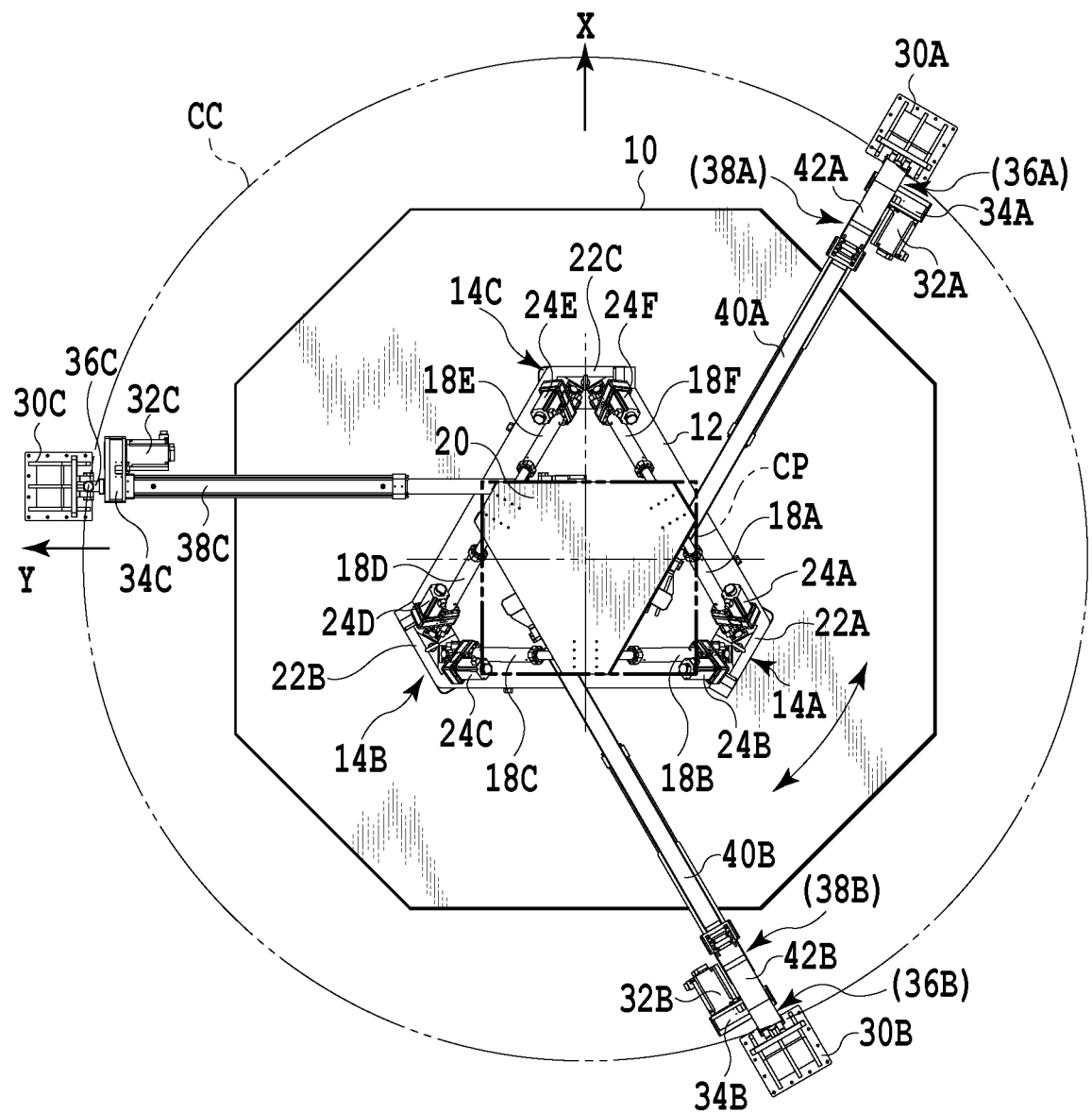
FIG. 2 is a plan view showing a constitution of an example of a tripod structure comprising an actuator according to the present invention together with a moving base and a hexapod.

FIG. 2 schematically shows a constitution of a vibration system for a simulator to which an example of a tripod structure comprising an actuator according to the present invention is applied.

In FIG. 2, the vibration system for a simulator is arranged, for example, in a predetermined position in a driving simulator. A not-illustrated cockpit CP of a vehicle model is fixed to a cockpit supporting bed 20 in an upper end of a hexapod described later. The cockpit CP is arranged on the cockpit supporting bed 20 so that a front end and left door of the vehicle model are directed in directions indicated by arrows X and Y in FIG. 2, respectively.

The vibration system for a simulator includes the following as major components: three vibration devices arranged in three places spaced equally along a circumferential direction so as to surround the cockpit CP and configured to reciprocate and rotate a moving base 12 described later; the moving base 12 located closer to the cockpit CP than to each vibration device and connected to one end of each vibration device; a hexapod located between the cockpit supporting bed 20 and the moving base 12 to control the orientation of the cockpit supporting bed 20; a slide duct device attached to each vibration device; and a host computer (not illustrated).

The moving base 12 with three degrees of freedom is reciprocatably and rotatably located on a sliding floor 10 having a predetermined flatness. That is, the moving base 12 is rotatable in both directions indicated by arrows in FIG. 2 and reciprocatable along an axis of a piston of an actuator of each vibration device described later.

Air bearings 14A, 14B, and 14C are provided in three places on a lower surface of the moving base 12 facing a surface of the sliding floor 10. The air bearings 14A, 14B, and 14C abut on the surface of the sliding floor 10 in a case where operation air is not supplied to a pneumatic tank (not illustrated) and are spaced from the surface of the sliding floor 10 by a predetermined clearance in a case where operation air is supplied to the tank. An excessive floating of the moving base 12 from the surface of the sliding floor 10 in a direction orthogonal to the arrows X and Y described above by a predetermined distance or more is detected by an abnormality sensor (not illustrated) provided on a side surface of the moving base 12.

On an upper surface of the moving base 12, actuator supporting beds 22A, 22B, and 22C are provided so as to face the air bearings 14A, 14B, and 14C described above, respectively. The actuator supporting bed 22A is connected to one end of each of actuators 18A and 18B constituting a hexapod described later via a universal joint. The actuator supporting bed 22B is connected to one end of each of actuators 18C and 18D constituting the hexapod via a universal joint. The actuator supporting bed 22C is connected to one end of each of actuators 18E and 18F constituting the hexapod via a universal joint.

The hexapod with six degrees of freedom includes the following as major components: the actuators 18A, 18B, 18C, 18D, 18E, and 18F each of which has a piston provided with the universal joint; servomotors 24A, 24B, 24C, 24D, 24E, and 24F configured to drive the actuators 18A to 18F, respectively; and speed reduction mechanism units configured to decrease and transmit outputs from the servomotors 24A to 24F to the actuators 18A to 18F, respectively. The actuators 18A to 18F have the same structure. For example, each of the actuators 18A to 18F includes a ball screw (piston) and a ball nut. The servomotors 24A to 24F each of which has a rotary encoder, are driven and controlled by a host computer in accordance with a predetermined simulation program based on detection outputs from not-illustrated respective position sensors. The position sensors are configured to detect the respective positions of the pistons of the actuators 18A to 18F.

The three vibration devices includes actuator supporting beds 30A, 30B, and 30C, respectively. The actuator supporting beds 30A, 30B, and 30C are arranged on a floor so that universal joints 36A to 36C are located on a common circumference CC at intervals of a predetermined angle, for example, 120°. The actuator supporting beds 30A, 30B, and 30C support actuators 38A, 38B, and 38C and the like described later via supporting plates 34A to 34C and the universal joints 36A to 36C, respectively. The actuators 38A, 38B, and 38C having the same structure form a three-axis (tripod) structure for driving the moving base 12.

Since the actuator supporting beds 30A to 30C have the same structure and the supporting plates 34A to 34C have the same structure (see FIGS. 1 and 2), descriptions will be given of the actuator supporting bed 30A and supporting plate 34A while descriptions will be omitted of the other actuator supporting beds and supporting plates.

One end surface of the supporting plate 34A is supported rotatably by the actuator supporting bed 30A via the universal joint 36A. The other end surface of the supporting plate 34A is provided with the actuator 38A and the servomotor 32A which includes a rotary encoder. An output shaft of the servomotor 32A is connected to a ball screw shaft 66 (see FIG. 1) in the actuator 38A via a speed reduction mechanism (not illustrated). Hereby, the host computer drives and controls the servomotor 32A, so that the movement of the actuator 38A is controlled.

The universal joints connected to alignment mechanism supporting blocks (not illustrated) of the three actuators 38A to 38C are located so that the rotation axes of the universal joints are located on a common circumference. Each of the alignment mechanism supporting blocks is fixed with a bolt (not illustrated) to both of a triangle plate (not illustrated) on the upper surface of the moving base 12 and the moving base 12. The triangle plate is fixed to the moving base 12 with a bolt (not illustrated) in a state where the center of the triangle plate is coincident with the center of rotation of the moving base 12. The alignment mechanism supporting blocks are fixed at positions spaced by the same predetermined distance from the center of rotation of the moving base 12 and the triangle plate. The predetermined distance is determined based on the swing angle, swing angular speed, and angular acceleration of the moving base 12, a movable range of the moving base, and the capabilities of manufacturable actuators. Herewith the moving base 12 is reciprocated and swung (rotated) in accordance with extension and retraction of the piston of the actuator 38A.

Slide duct devices are attached to the actuators 38A and 38B, respectively. Each of the slide duct devices includes the following as major components: a cableveyor (registered trademark) 42A (42B); a guide duct 40A (40B); and a slide rail unit (not illustrated) configured to slidably support the guide duct 40A (40B).

Since the three actuators 38A to 38C have the same structure, a description will be given of the structure of the actuator 38C while descriptions will be omitted of the structures of the other actuators 38A and 38B.

Figure 1:
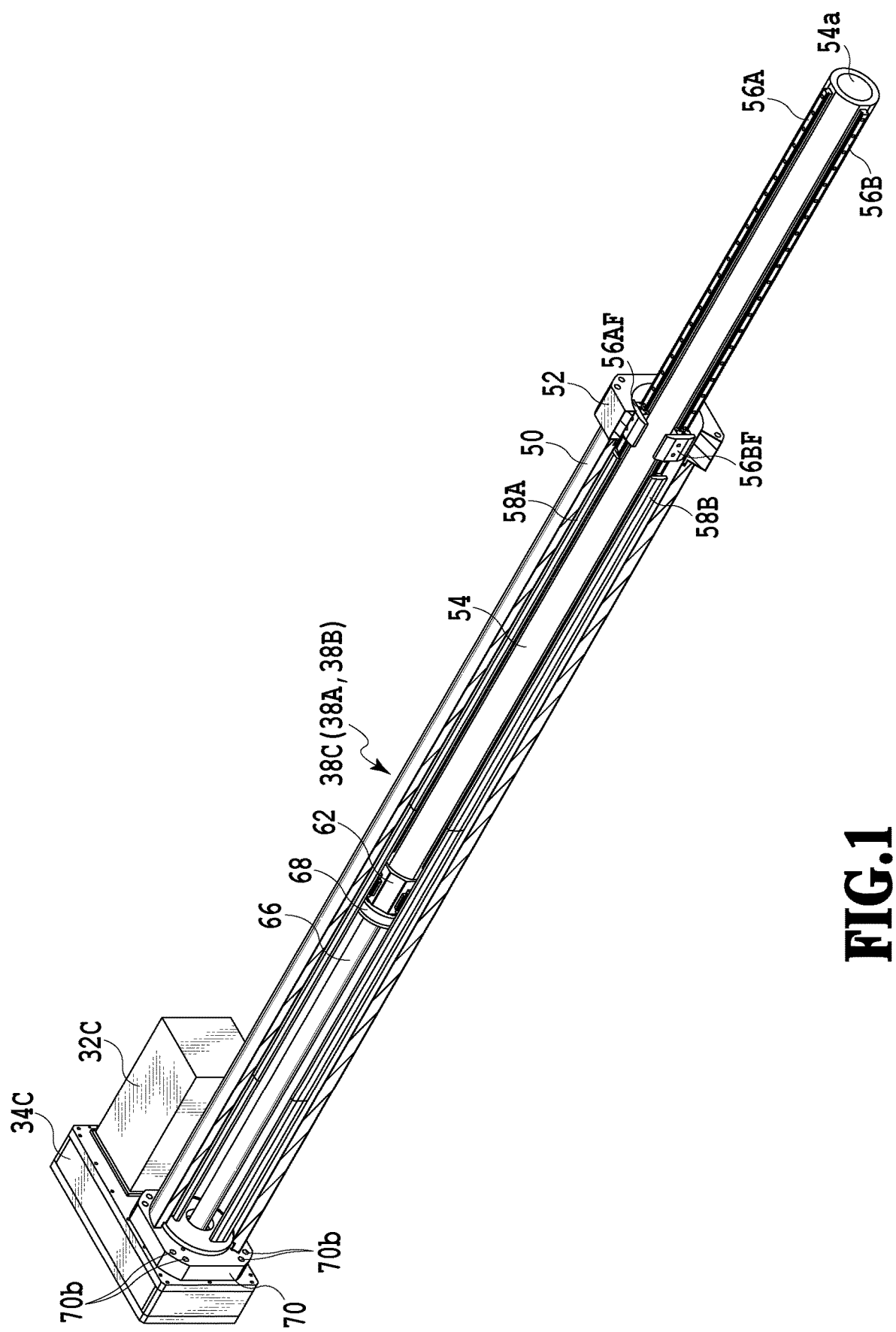
FIG. 1 is a perspective view showing a constitution of an example of an actuator according to the present invention with some portion cut away.

As shown in FIG. 1, the actuator 38C includes the following as major components: a cylinder 50 supported by the other end surface of the supporting plate 34C; a ball screw shaft 66 having one end protruding into the cylinder 50 through through holes of the supporting plate 34C and a fixing plate 70; a slide block 62 screwed with the one end of the ball screw shaft 66 in the cylinder 50 (see FIG. 8); a cylindrical-shaped piston 54 coupled to an end of the slide block 62 and reciprocatably located in the cylinder 50 (see FIG. 9); linear motion bearing units 56AF and 56BF located inside a bearing housing 52 to movably support the piston 54; and linear motion bearing units 64A and 64B located in the cylinder 50 to movably support the slide block 62. (see FIG. 8).

The cylinder 50 is sandwiched between the fixing plate 70 fixed to the other end surface of the supporting plate 34C together with the servomotor 32C and the bearing housing 52.

The tip of the piston 54 protruding outward through an open end of the bearing housing 52 described above is connected to the alignment mechanism supporting block described above via the universal joint.

Figure 6:
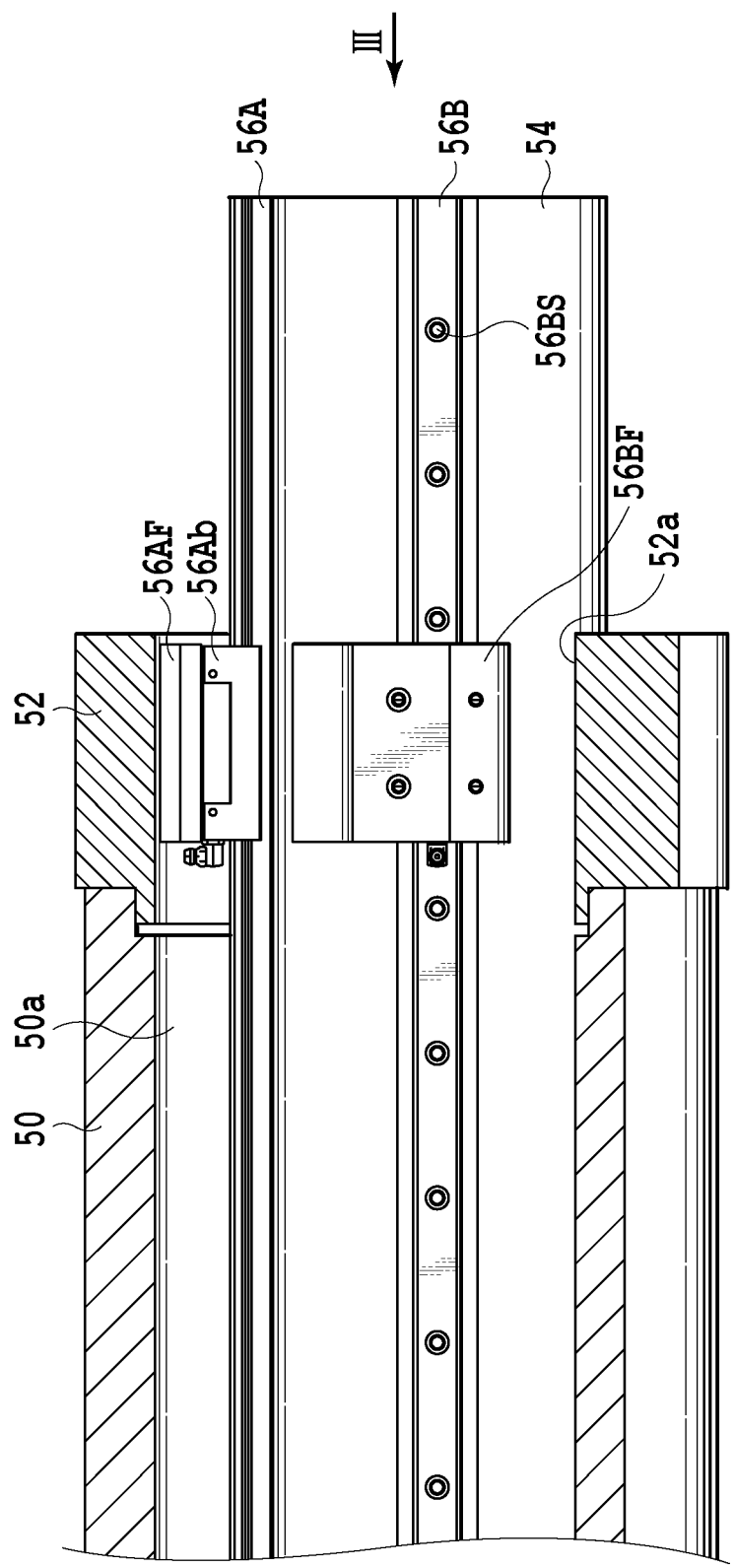
FIG. 6 is an arrow view seen from a direction indicated by arrow II in FIG. 5.

As shown in FIGS. 1 and 6, one end of a hole 50a formed along a central axis direction in the cylinder 50 is blocked by the fixing plate 70, and the other end communicates with a hole 52a of the bearing housing 52. The fixing plate 70 and the bearing housing 52 located at each end of the cylinder 50 are fastened with a stud bolt and a nut (not illustrated) inserted between screw holes 70b of the fixing plate 70 (see FIG. 1) and through holes 52b of the bearing housing 52 (see FIG. 3).

Figure 3:
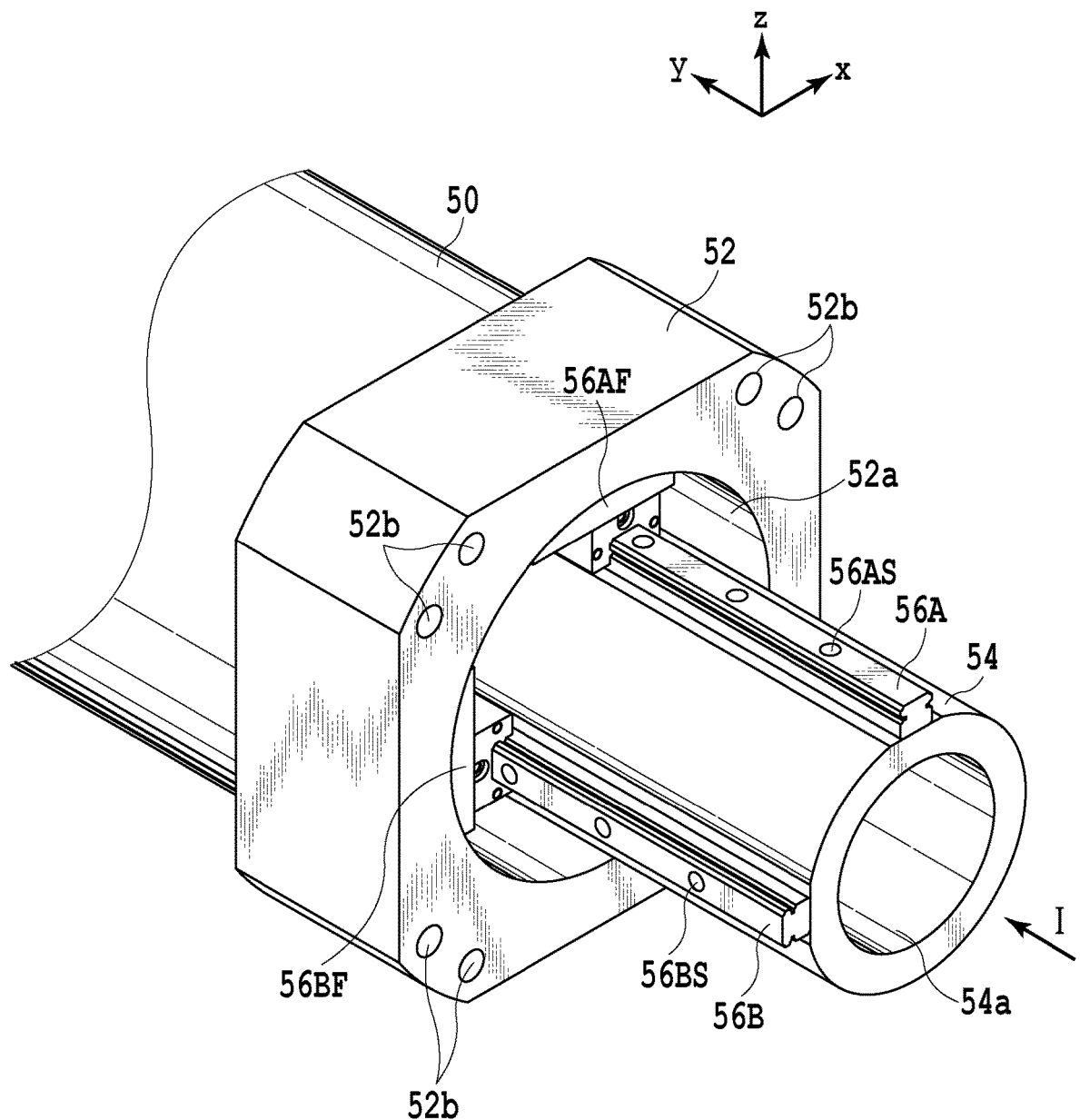
FIG. 3 is an enlarged perspective view showing a portion of the appearance of the actuator shown in FIG. 1.
Figure 4:
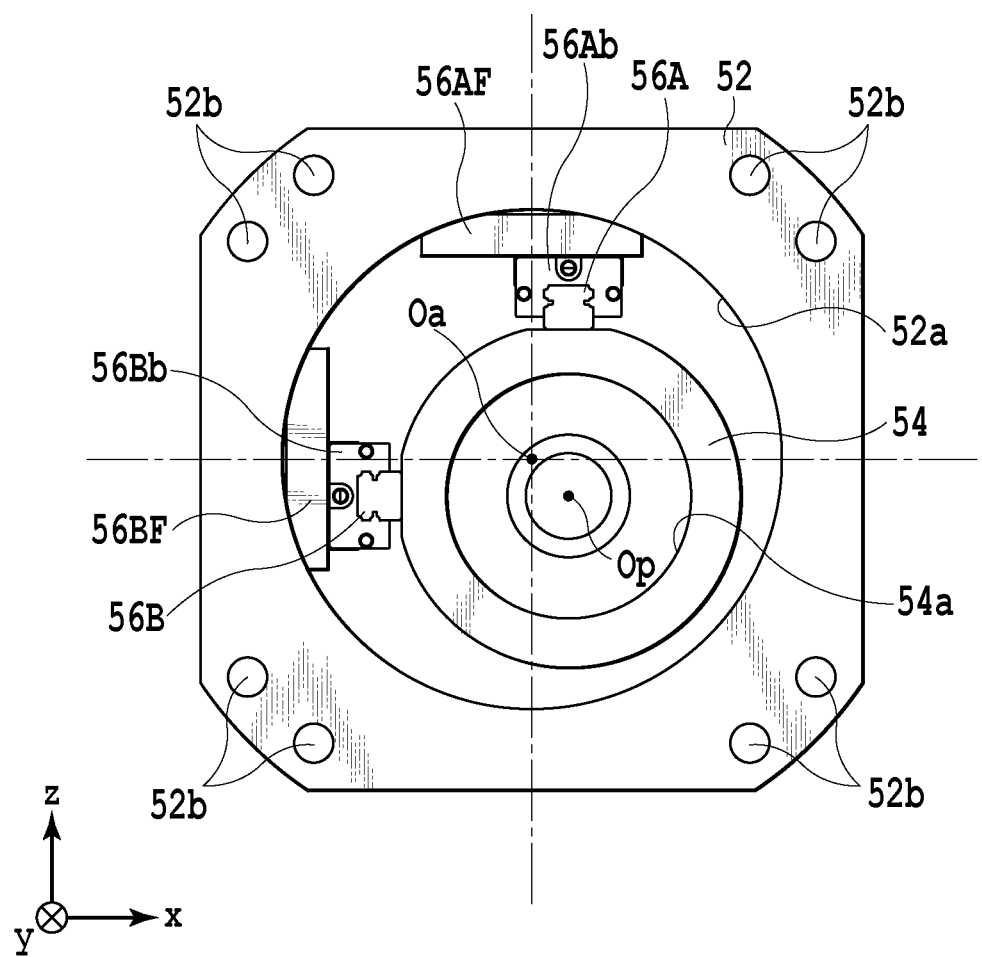
FIG. 4 is an arrow view seen from a direction indicated by arrow I in FIG. 3.

As shown in FIG. 3, the bearing housing 52 has, in the center, a circular hole 52a from which the piston 54 protrudes outward. As shown in FIG. 4, the center position of the piston 54 is set to, for example, a position Op decentered diagonally downward to the right by a predetermined distance with respect to a center position Oa of the hole 52a of the bearing housing 52. The center position of the piston 54 is set to the position Op decentered diagonally downward to the right as described above, so that the linear motion bearing unit 56AF and linear motion bearing unit 56BF described later can be arranged without greatly changing the sizes of the cylinder 50 and the bearing housing 52.

Eight through holes 52b into which the stud bolts described above are inserted are formed around the hole 52a of the bearing housing 52 along the circumferential direction. Each through hole 52b of the bearing housing 52 penetrates from one end to the other end along the central axis direction of the piston 54.

Figure 7:
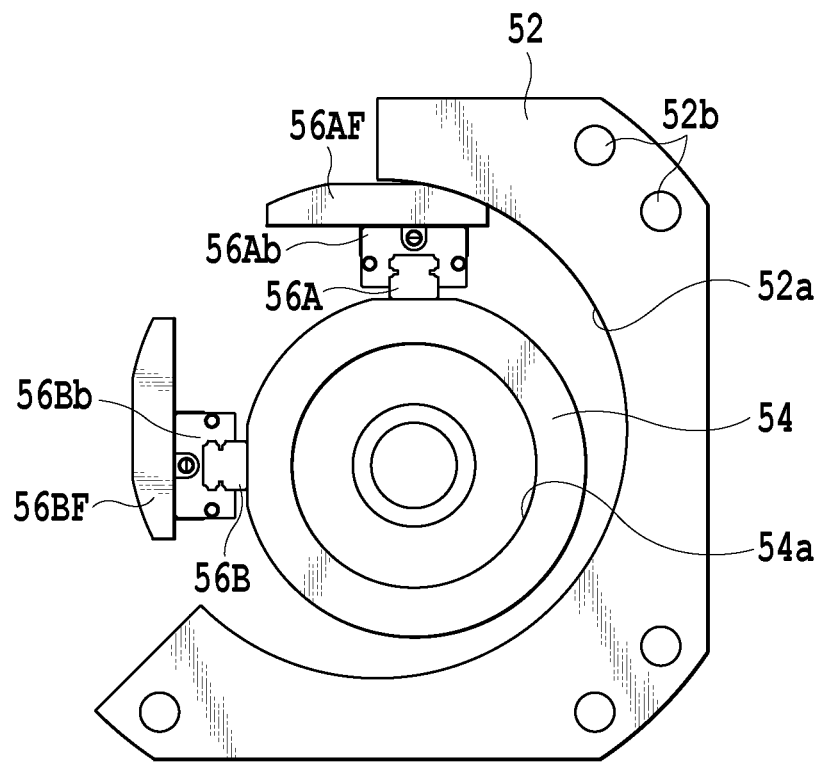
FIG. 7 is an arrow view seen from a direction indicated by arrow III in FIG. 6.

As shown in FIGS. 6 and 7, on the inner peripheral surface of the hole 52a of the bearing housing 52, a guide block 56Ab of the linear motion bearing unit 56AF and a guide block 56Bb of the linear motion bearing unit 56BF are fixed to the bearing housing 52 with a mounting bolt (not illustrated). The guide block 56Ab and guide block 56Bb are arranged on the inner peripheral surface of the hole 52a of the bearing housing 52 so as to be spaced from each other at approximately 90° along the circumferential direction. That is, the guide block 56Ab is located in a direction in which the weight of the piston 54 is applied, and the guide block 56Bb is arranged in a direction substantially orthogonal to the direction in which the weight of the piston 54 is applied.

Figure 5:
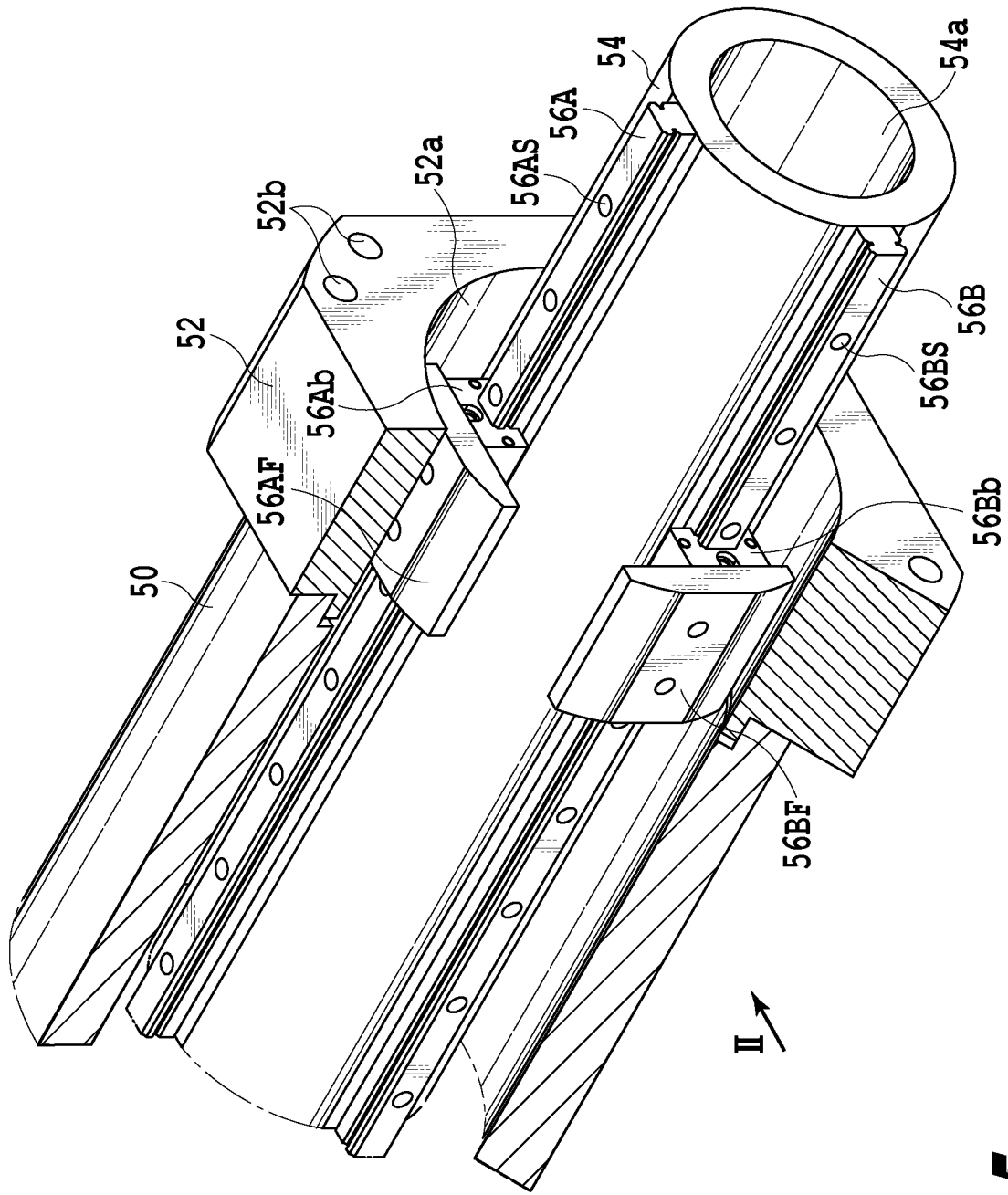
FIG. 5 is an enlarged perspective view showing a portion of the actuator shown in FIG. 1.

On the outer peripheral surface of the piston 54, rails 56A and 56B are fixed to positions corresponding to the guide block 56Ab and the guide block 56Bb on the outer peripheral surface of the piston 54 with mounting bolts 56AS and 56BS (see FIG. 5), respectively. As shown in FIG. 6, one end surface of each of the rails 56A and 56B is located so as not to extend beyond the end surface of the piston 54, and as shown in FIG. 1, the other end surfaces of the rails 56A and 56B extend to the vicinity of the end surfaces of rail pedestals 58A and 58B (rails 60A and 60B) (see FIG. 9) described later along the central axis of the piston 54, respectively. In a portion fitted to the rail 56A in the guide block 56Ab that guides the rail 56A, for example, a plurality of balls are arranged as rolling elements so as to form a linear motion bearing as shown in Patent Literature 3 (see FIG. 2A). A plurality of similar balls are also arranged in a portion fitted to the rail 56B in the guide block 56Bb that guides the rail 56B. As a result, in FIG. 4, the piston 54 is supported by the linear motion bearing unit 56AF and the linear motion bearing unit 56BF in a Z coordinate axis direction along a direction of the weight of the piston 54 and an X coordinate axis direction orthogonal to the Z coordinate axis. The Y coordinate axis is set along a moving direction of the piston 54. The rated load and the allowable moment of each of the linear motion bearing units 56AF and 56BF can be set to be equal to or higher than those of conventional slide bearings.

Figure 9:
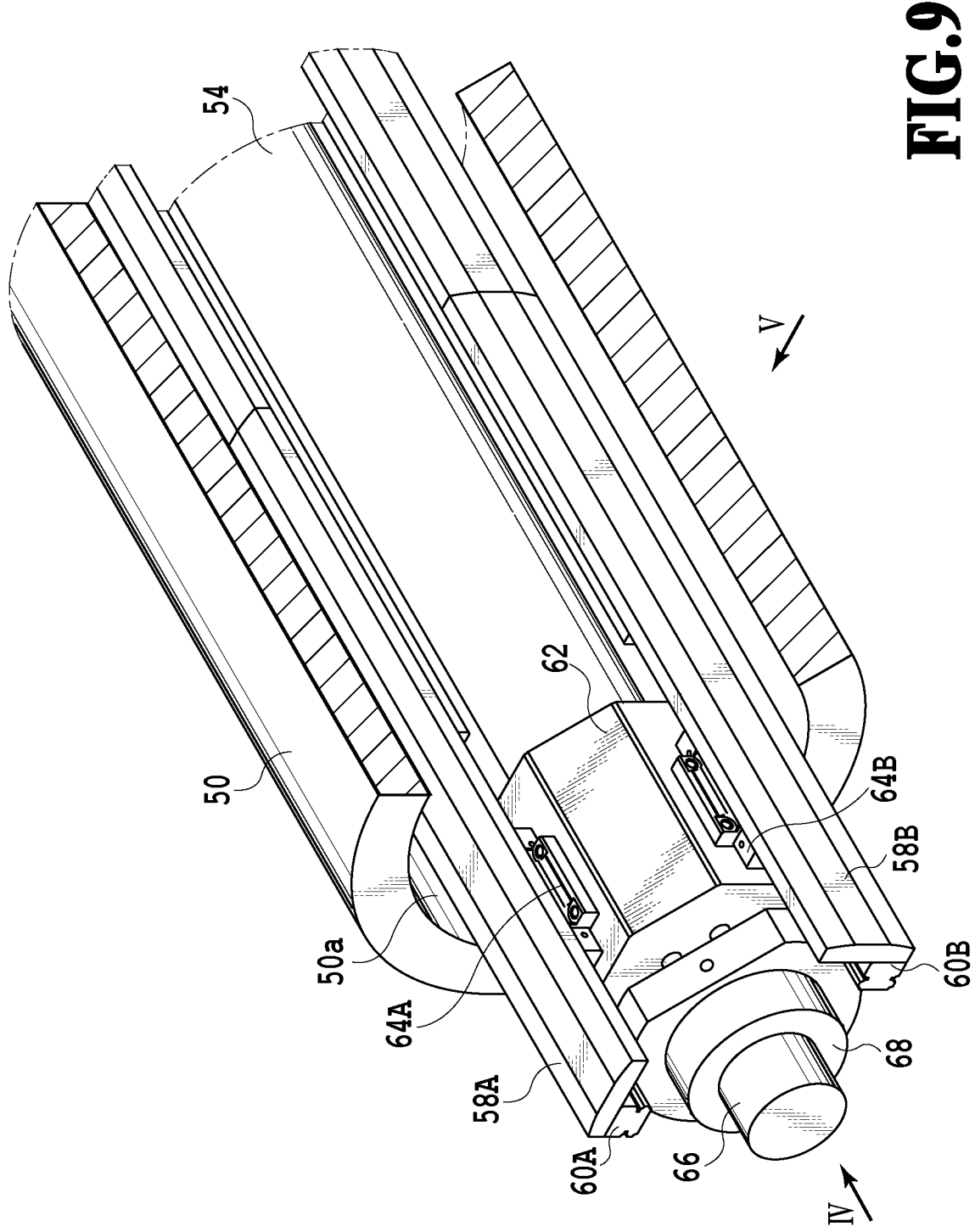
FIG. 9 is a perspective view showing together with the piston the slide block of which portion is cut away in the perspective view shown in FIG. 8.
Figure 10:
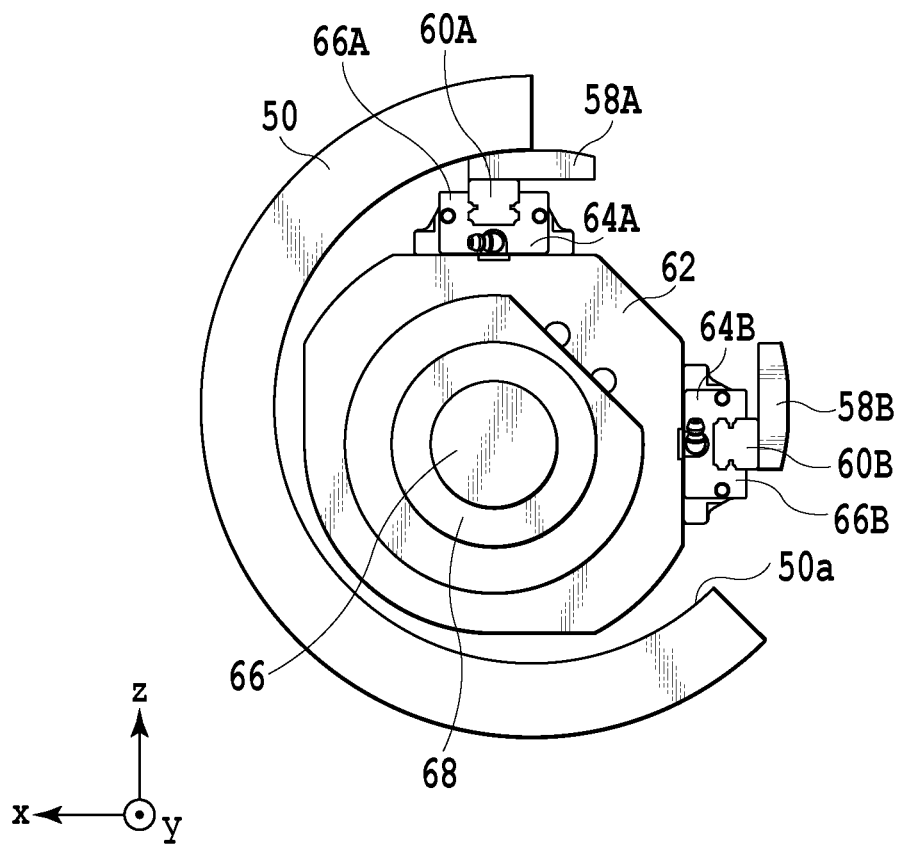
FIG. 10 is an arrow view seen from a direction indicated by arrow IV in the perspective view of FIG. 9.

The rail pedestals 58A and 58B of the linear motion bearing units 64A and 64B located in the cylinder 50 to movably support the slide block 62 are fixed with the mounting bolt to positions shown in FIGS. 9 and 10 on the inner peripheral surface of the hole 50a of the cylinder 50. As shown in FIG. 1, the other ends of the rail pedestals 58A and 58B extend into the cylinder 50 along the central axis of the piston 54 near the end surface of the fixing plate 70 described above. As shown in FIG. 10, the rail pedestals 58A and 58B are arranged on the inner peripheral surface of the hole 50a so as to be spaced from each other at approximately 90° along the circumferential direction of the inner peripheral surface of the hole 50a of the cylinder 50.

Figure 11:
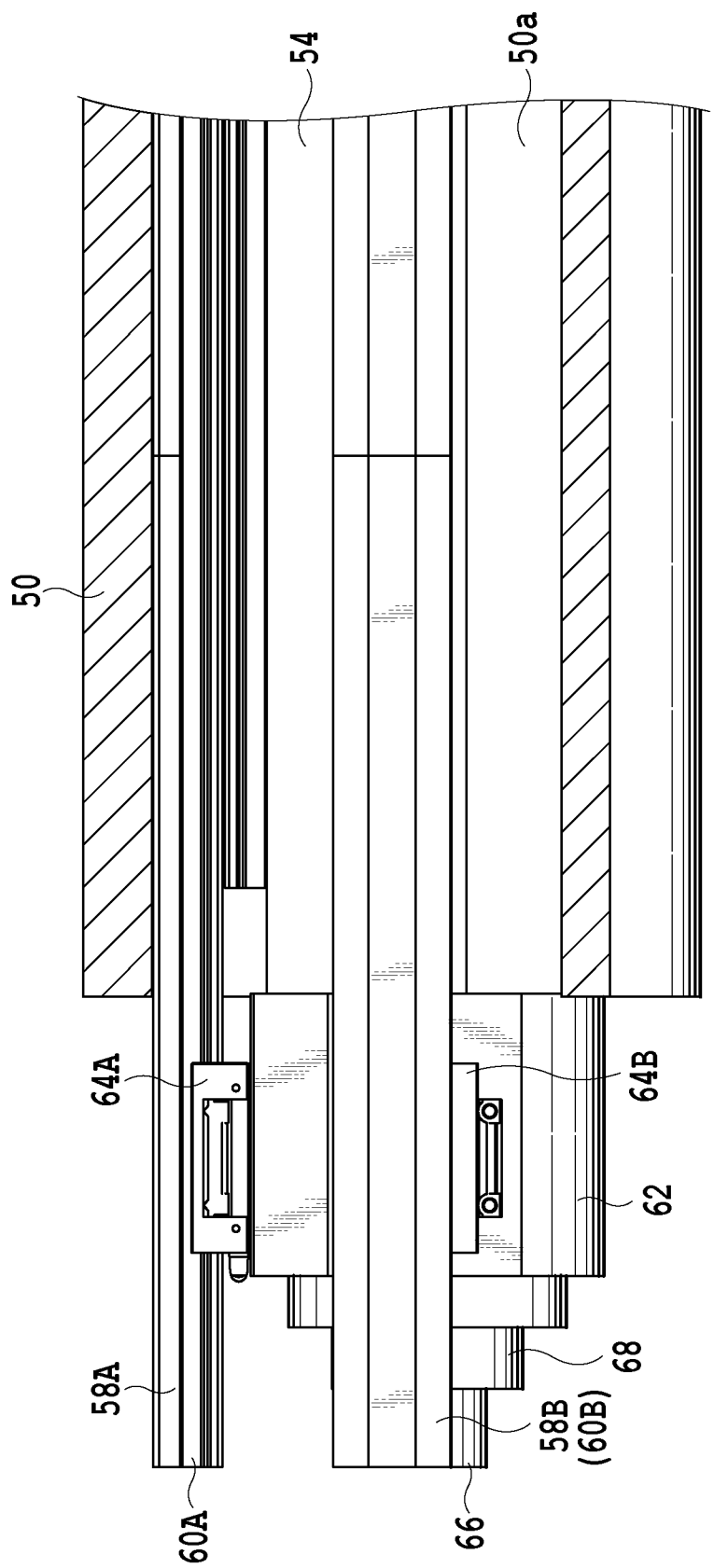
FIG. 11 is an arrow view seen from a direction indicated by arrow V in the perspective view of FIG. 9.

As shown in FIGS. 10 and 11, the guide blocks 66A and 66B are fixed to positions corresponding to the rail 60A on the rail pedestal 58A and the rail 60B on the rail pedestal 58B as a linear motion bearing, respectively on the flat surfaces of the outer peripheral portions of the slide block 62 facing the rail pedestals 58A and 58B. In a portion fitted to the rail 60A in the guide block 66A that guides the rail 60A, for example, a plurality of balls are arranged as rolling elements so as to form a linear motion bearing as shown in Patent Literature 3 (see FIG. 2A). A plurality of similar balls are also arranged in a portion fitted to the rail 60B in the guide block 66B that guides the rail 60B. As a result, the rated load and the allowable moment of each of the linear motion bearing units 64A and 64B can be set to be equal to or higher than those of conventional nut guides.

Figure 8:
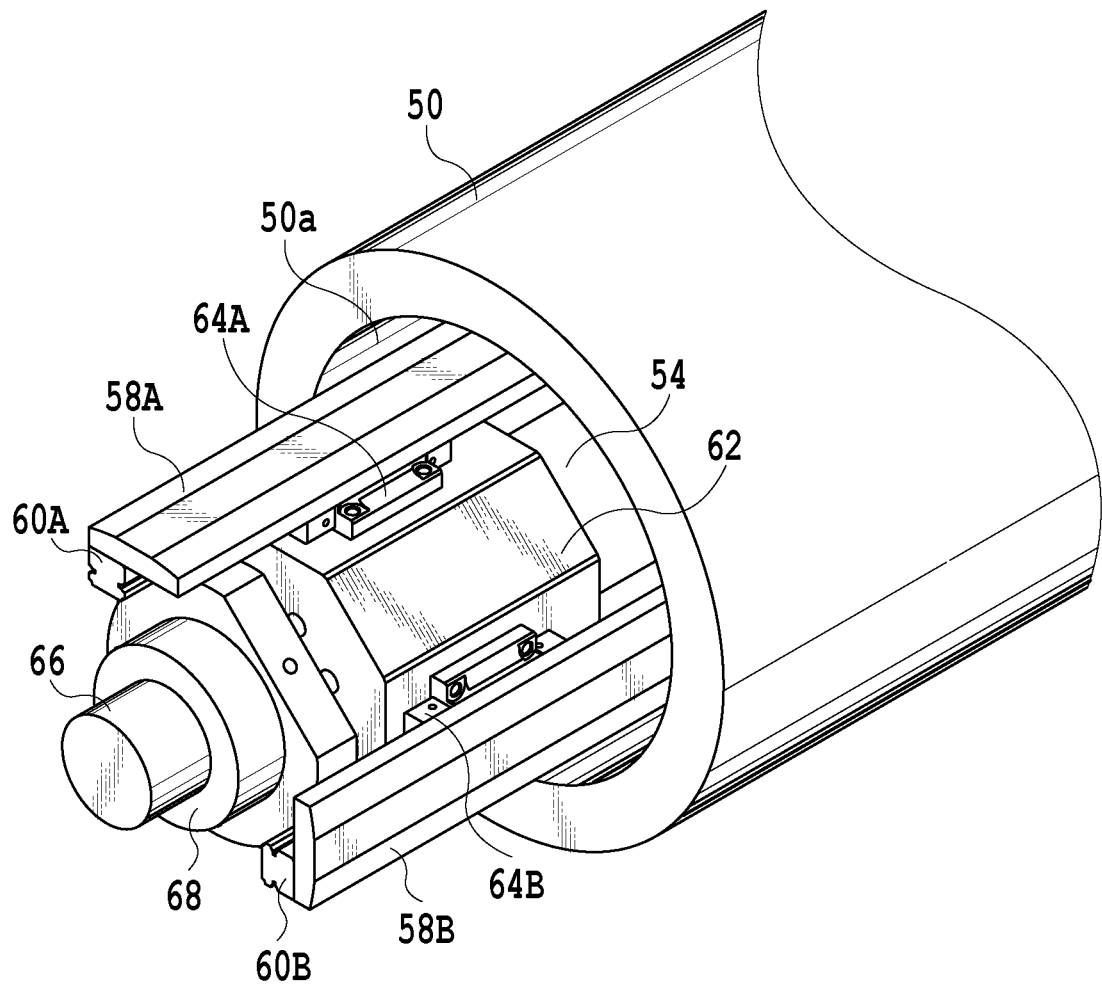
FIG. 8 is an enlarged perspective view showing a portion of a slide block in the actuator shown in FIG. 1 together with a piston.

As shown in FIGS. 8 and 9, in a case where the slide block 62 is moved toward an elastic damper (not illustrated) provided on the fixing plate 70 described above, a damper receiving flange 68 abutting the damper (not illustrated) is fixed to one end surface of the slide block 62 into which the ball screw 66 is inserted. The end of the piston 54 is coupled to the other end surface of the slide block 62 from which the ball screw 66 protrudes. The ball screw 66 protruding from the other end surface of the slide block 62 extends in the hole 54a of the piston 54 by a predetermined length.

As a result, in FIG. 10, the slide block 62 and the piston 54 (see FIG. 8) are supported by the rail 60A on the rail pedestal 58A and the rail 60B on the rail pedestal 58B as a linear motion bearing and the guide blocks 66A and 66B in a Z coordinate axis direction along the directions of the weights of the slide block 62 and the piston 54 and an X coordinate axis direction orthogonal to the Z coordinate axis. The Y coordinate axis is set along the moving direction of the piston 54.

In the above constitution, in a case where the moving base 12 is reciprocated and swung in accordance with the extension and retraction of the pistons 54 of the actuators 38A to 38C, when a force is applied as a reaction force to the tip portion connected to the universal joint in the piston 54 of each of the actuators 38A to 38C, so that a bending moment is applied to the piston 54, the piston 54 is movably supported in four positions by the linear motion bearing units 56AF and 56BF in the bearing housing 52 and the linear motion bearing units 64A and 64B in the cylinder 50. In a case where the piston 54 is supported, for example, by a sliding bearing and a nut guide as shown in Patent Literature 2, when the state of the piston 54 shifts from a state of being extended maximally to a retracted state, the greatest acceleration shock may be detected in the actuator.

Figure 12A:
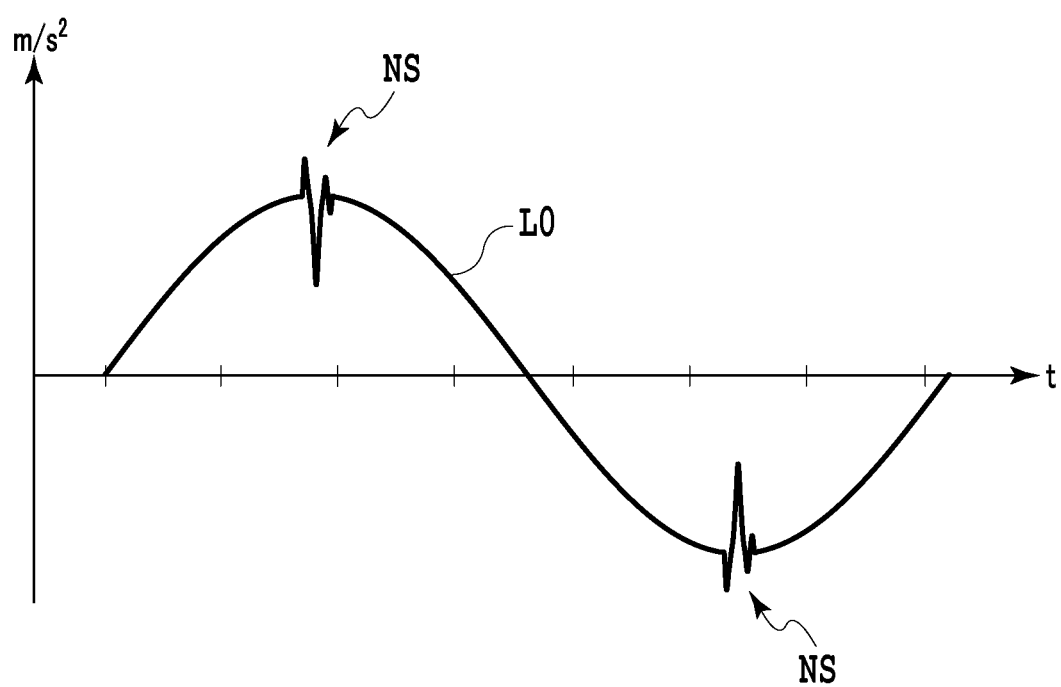
FIG. 12A is a characteristic diagram showing an output characteristic line obtained from an acceleration sensor provided on a tip of a conventional piston.
Figure 12B:
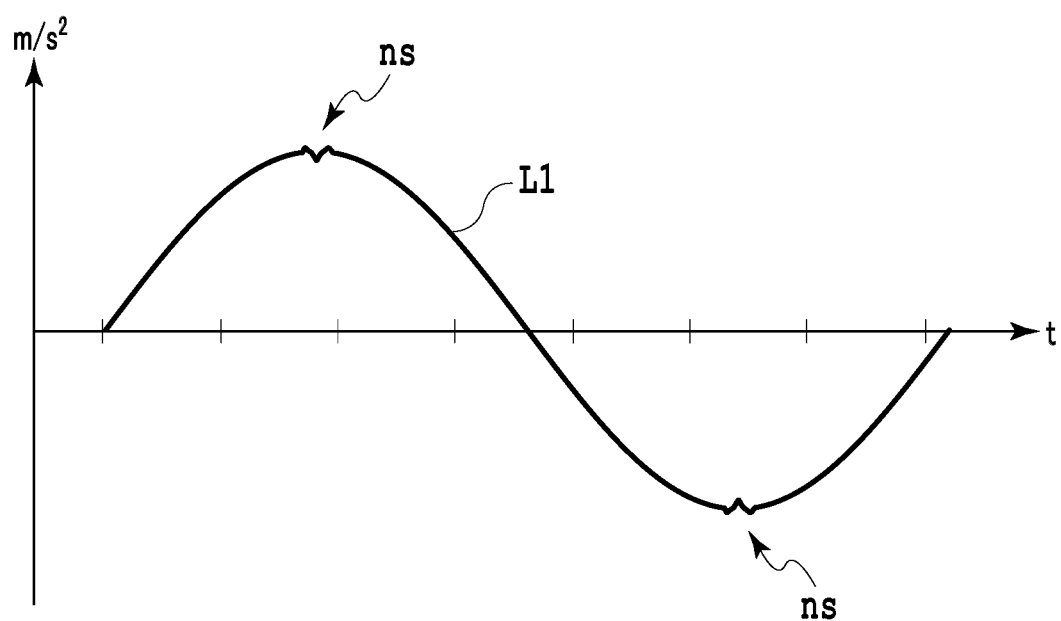
FIG. 12B is a characteristic diagram showing an output characteristic line obtained from an acceleration sensor provided on a tip of a piston in an example of the actuator according to the present invention.

The inventors of the present application have verified such an acceleration shock in an actuator based on an output characteristic line Lo and an output characteristic line L1 as shown in FIGS. 12A and 12B. In FIGS. 12A and 12B, a vertical axis represents acceleration (m/s$^2$) and a horizontal axis represents time t (s), and FIGS. 12A and 12B show output characteristic lines Lo and L1 obtained from an acceleration sensor provided on the tip of the piston in a case where the piston 54 reciprocates twice. The output characteristic line Lo represents an obtained output characteristic line in a case where the piston is supported, for example, by the slide bearing and nut guide as shown in Patent Literature 2. In the output characteristic line Lo, the acceleration shock is detected as noise NS representing the greatest acceleration shock when the state shifts from the state of being extended maximally to the retracted state. A similar waveform is also detected when the piston turns back in the middle of extension to the retracted state. The output characteristic line L1 represents an obtained output characteristic line in a case where the piston 54 in an example of the actuator according to the present invention is movably supported in four positions by the linear motion bearing units 56AF and 56BF shown in FIG. 1 and the linear motion bearing units 64A and 64B. As is clear from the output characteristic line L1, noise ns representing a detected acceleration shock is smaller.

This is because a linear motion bearing is used instead of a sliding bearing and a nut guide used in the conventional actuator as shown in Patent Literature 2, so that the kind of frictional resistance is changed from sliding frictional resistance to rolling frictional resistance, and the resistance force of the linear motion bearing is reduced to about 1/10 or less of the resistance force of the sliding bearing. As a result, since an acceleration shock generated when the piston 54 turns back can be reduced, it is possible to reduce effects on an evaluation in a test in which a minor movement which is originally intended to be evaluated is reproduced.

The invention claimed is:

1. An actuator comprising:
   a cylinder supported by a supporting plate together with a drive motor;
   a piston located reciprocatably in the cylinder;
   a ball screw shaft located in the cylinder and driven by the drive motor;
   a slide block screwed with one end of the ball screw shaft in the cylinder and coupled to an end of the piston;
   a first linear motion bearing unit and a second linear motion bearing unit each of which is located in a bearing housing at one end of the cylinder and has a rail provided on the piston to extend along a central axis of the piston and a guide block configured to support the rail via a rolling element and which support the piston movably; and
   a third linear motion bearing unit and a fourth linear motion bearing unit each of which is located in the cylinder and has a rail pedestal provided on an inner peripheral surface of the cylinder to extend along the central axis of the piston and a guide block configured to support the rail pedestal via a rolling element and which support the slide block movably together with the piston,
   wherein the first linear motion bearing unit and the second linear motion bearing unit are located individually in a position in a circumferential direction of an outer peripheral portion of the piston in which a weight of the piston is applied and a position in a direction orthogonal to the direction in which the weight of the piston is applied, respectively, and the third linear motion bearing unit and the fourth linear motion bearing unit are located individually in a position in a circumferential direction of an outer peripheral portion of the slide block in which the weight of the piston is applied and a position in a direction orthogonal to the direction in which the weight of the piston is applied, respectively.

2. The actuator according to claim 1, wherein a position of the central axis of the piston in the bearing housing is eccentric by a predetermined distance in one direction along a radial direction with respect to a position of a central axis of the cylinder, so that each of the first linear motion bearing unit and the second linear motion bearing unit is located in a position in the other direction facing the one direction along the radial direction in the bearing housing.

3. The actuator according to claim 1, wherein the rolling element is a ball.

4. A tripod structure comprising an actuator, the tripod structure comprising:
   a first actuator according to claim 1 and a second actuator and a third actuator having constituent elements identical to those of the first actuator;
   a first actuator supporting bed configured to rotatably support the first actuator via a universal joint;
   a second actuator supporting bed configured to rotatably support the second actuator via a universal joint;
   a third actuator supporting bed configured to rotatably support the third actuator via a universal joint; and
   a moving base rotatably connected to a tip portion of a piston of the first actuator, a tip portion of a piston of the second actuator, and a tip portion of a piston of the third actuator via a universal joint.

* * * * *